Patented Aug. 16, 1949

2,479,367

UNITED STATES PATENT OFFICE 2,479,367

PROCESS FOR THE PREPARATION OF FLUOROETHYLENE INTERPOLYMERS

Robert M. Joyce, Jr., Wilmington, and John C. Sauer, Woodcrest, Del., assignors to E. I. du Pont de Nemours & Company, Wilmington, Del., a corporation of Delaware No Drawing. Application April 21, 1945, Serial No. 589,690

4 Claims. (Cl. 260—87.5)

This invention relates to an improved process for the preparation of fluoroethylene interpolymers.

The preparation of interpolymers of fluoroethylenes, such as tetrafluoroethylene, trifluorochloroethylene, vinylidene fluoride and vinyl fluoride, is disclosed in the following copending U. S. applications: Serial No. 470,097, filed December 24, 1942 by Merlin Martin Brubaker (now U. S. Patent No. 2,393,967); Serial No. 463,410 (now abandoned), filed October 26, 1942 by William E. Hanford and John R. Roland, Jr.; Serial No. 530,750 (now abandoned), filed April 12, 1944 by William Edward Hanford and Robert M. Joyce, Jr.; Serial No. 449,765 (now abandoned), filed July 4, 1942 by Merlin Martin Brubaker; Serial No. 500,848 now U. S. Patent 2,467,234, filed September 1, 1943 by William Edward Hanford and Donald Edward Sargent; Serial No. 507,602, filed October 25, 1943 by William Edward Hanford (now U. S. Patent No. 2,392,378) and Serial No. 524,300, now U. S. Patent 2,468,054, filed February 28, 1944 by Thomas A. Ford. In general, the processes disclosed in said applications involve the interpolymerization of a fluoroethylene in the presence of water, an organic solvent, or water plus an inert organic solvent, and a peroxy initiator such as benzoyl peroxide or a persulfate.

Systems in which water alone is employed as medium give rise to interpolymers which are not wet by the reaction medium, and which tend to become consolidated into large agglomerates which plug valves or lines through which transmission is desired, or which form compact, tightly adhering masses on stirrer blades, thermocouple wells, and reactor walls. Since interpolymers of the fluoroethylenes generally soften at temperatures above normal polymerization temperatures this difficulty cannot be resolved by carrying out the polymerization above the softening point of the polymer. Some of these objectionable features can be overcome, according to the teaching of the aforementioned applications, by conducting the interpolymerization in the presence of organic solvents, or mixtures of these with water. The use of water-immiscible solvents, however, gives a two phase liquid medium, which is a distinct disadvantage in large scale operations, particularly on a continuous basis. A similar situation obtains for water-immiscible liquid monomers in water alone.

When organic solvents alone, or homogeneous mixtures thereof with water are employed, and, according to the specific teachings of the art, organic peroxy initiators, many of these disadvantages are overcome. However, such initiators in general require relatively high pressures and temperatures in order to obtain high yields of the interpolymer. The former are objectionable from an engineering point of view; moreover, they often produce explosive reactions, particularly with monomer mixtures containing high proportions of fluoroethylenes. High temperatures tend to give low molecular weight interpolymers and uncontrollable reaction rates.

This invention has as an object a process for the preparation of interpolymers of fluoroethylenes in finely divided form and wet by the reaction medium. A further object is to provide a process for the preparation of such interpolymers by which high molecular weight interpolymers are obtained at temperatures and pressures markedly lower than those necessary to obtain interpolymers of comparable properties using the prior art processes, with attendant operational improvements, decrease of explosion hazards and beneficiation of interpolymer properties. A still further object is to provide a process for the preparation of such interpolymers employing a water-soluble salt of a true inorganic peracid as initiator. Additional objects will become apparent from an examination of the following description and claims.

These and other objects and advantages are accomplished according to the herein described invention which comprises subjecting to the action of a water-soluble salt of an inorganic peracid a mixture comprising a fluoro compound having the general formula

wherein X, Y and Z are atoms of the group consisting of hydrogen atoms and halogen atoms of atomic weight less than 100, and wherein not more than one of said X, Y and Z atoms is halogen other than fluorine, and at least one other polymerizable compound containing a terminal ethylenic double bond, the molar percentage of said compound

in said mixture being within the range of from 5% to 95%, said mixture being subjected to said water-soluble salt in the substantial absence of molecular oxygen at a temperature within the range of from 20° C. to 150° C. under superatmospheric pressure in the presence of a medium comprising water and a neutral, water-soluble compound free from carbon-to-carbon unsaturation which consists solely of carbon, hydrogen and oxygen, contains from 1 to 5 carbon atoms and which gives a negative test for the aldehyde group either before or after hydrolysis when treated with Fehling's solution; i. e., compounds which are free of an aldehyde group or a group which upon hydrolysis yields an aldehyde group.

By the term "neutral, water-soluble compound," as employed herein and in the appended claims, is meant a compound which is dissolved by water to provide a solution having a pH of 7.

Various arrangements and selections of equipment for the operation of this process are possible. In the preferred arrangement, however, the reaction is effected in a pressure reactor equipped with means for agitation, for measurement of temperature and pressure and for admitting the gas and/or liquid under pressure. In one method of operating the process the pressure reactor is filled about half full of the azeotropic mixture of water and tert. butyl alcohol (88% tert. butyl alcohol by weight) containing 0.1% dissolved ammonium persulfate. The reactor is flushed with nitrogen prior to filling and the filling operation is carried out under a blanket of nitrogen in order to exclude atmospheric oxygen as completely as possible. The reactor is then closed, evacuated, and a mixture of the monomers to be interpolymerized, for example, an equimolar mixture of tetrafluoroethylene and ethylene, is admitted to about two-thirds of the desired operating pressure. Agitation is started and the reaction mixture is heated to the desired temperature, generally 50°–60° C. Additional monomer is then added to bring the reaction pressure to the desired value. The inception of interpolymerization is indicated by a drop in pressure. It is preferred to maintain the reaction pressure within fairly narrow limits, for example 300–350 lbs./sq. in., by the injection of additional monomer mixture as the reaction proceeds. This can also be accomplished by the injection of additional liquid medium, rather than additional monomer. In either case, the reaction can proceed until the reactor contains so much interpolymer that the agitation efficiency is markedly diminished, when the reaction rate will drop off. It is often desirable to stop the reaction before this in order to obtain an interpolymer slurry of a prescribed solids content; this point can be identified by correlation of total pressure drop with the dimensions and filling volume of a given reactor. The reaction may be stopped at any point by cooling the contents of the reactor, by bleeding off the monomers, or by injecting an inhibitor into the reactor. Any excess pressure is then bled off, the reactor is opened, and the reaction mixture is obtained as a slurry or paste which will be thin or thick depending upon the ratio of solid interpolymer to liquid medium. The interploymer can be isolated, for example, by blowing this slurry with steam to remove the organic solvent, filtering, and drying the interpolymer, which is obtained as a finely divided powder.

The following examples, in which proportions are in parts by weight unless otherwise specified, are given for illustrative purposes and are not intended to place any restriction on the herein described invention.

Example I

A tubular pressure reactor is filled approximately half full with a solution containing 1960 parts of tert. butyl alcohol and 40 parts of water, maintaining a blanket of nitrogen over the operation. One part of ammonium persulfate is added and the reactor then closed, evacuated, and pressured to 200 lbs./sq. in. with a mixture of tetrafluoroethylene and ethylene containing 88.5% tetrafluoroethylene by weight. The reactor is then agitated and warmed to 50° C. The pressure is maintained at 300 lbs./sq. in. by the continuous injection, as required, of a mixture of tetrafluoroethylene and ethylene containing 78% tetrafluoroethylene by weight. After one hour the reactor is cooled, the pressure is released and the reactor is opened. The product, a thick paste comprising tetrafluoroethylene/ethylene interpolymer dispersed in the liquid medium, is subjected to steam distillation to remove the major portion of the tert. butyl alcohol. The resulting slurry of interpolymer in water is filtered and the interploymer finally dried in an oven at 150° C. There are obtained 300 parts of white finely divided tetrafluoroethylene/ethylene interpolymer containing 60.1% fluorine corresponding to a mole ratio of tetrafluoroethylene to ethylene of 1:0.945, or 79.1% tetrafluoroethylene by weight.

Example II

An internally stirred 7-gallon stainless steel lined autoclave is flushed with nitrogen and charged with 1980 parts of oxygen-free water, 13 parts of ammonium persulfate, and 12,320 parts of tert. butyl alcohol. A blanket of nitrogen is maintained over the liquid charge during the closure of the autoclave. The autoclave is then purged first with nitrogen and then with a mixture of tetrafluoroethylene and ethylene containing 79% tetrafluoroethylene by weight. After the purging operation the autoclave is pressured to 200 lbs./sq. in. with this mixture, agitation is started, and the reactants heated to 60° C. Additional monomer mixture is added to bring the pressure to 300 lbs./sq. in., and the immediate inception of reaction is signalled by a drop in the pressure. The reaction is maintained at 58–64° C. for a period of 2 hours, while the pressure is maintained in the range of 245–325 lbs./sq. in. by intermittent injection of monomer mixture. At the end of this period the reactor is cooled, the pressure released, and the head of the autoclave is removed. The thick interpolymer slurry is removed from the autoclave, blown with steam, filtered, and dried. There are obtained 2,575 parts of finely divided tetrafluoroethylene/ethylene interpolymer.

Fluorine analysis indicates 54.7% fluorine by weight in the interpolymer. The pressed films of the interpolymer have tensile strengths of 4,450 lbs./sq. in. at 396% elongation and power factors of $10 \times 10^{-4}$ at 1000 cycles.

Example III

A high pressure tubular reactor is filled approximately half full with a solution containing 250 parts of oxygen-free water, 15 parts of ammonium persulfate and 1380 parts of tert. butyl alcohol. The filling operation is conducted under a blanket of oxygen-free nitrogen. The reactor is closed, evacuated, and heated to 60° C. under a pressure of 500 lbs./sq. in. of a mixture of tetrafluoroethylene and ethylene containing 50% tetrafluoroethylene by weight. The reaction is maintained in the pressure range 450–500 lbs./sq. in. for 14 hours by the addition of additional monomer mixture as required. At the end of this time the reactor is cooled, the pressure released, and the reactor is opened. The interpolymer slurry is worked up as in Example I and there are obtained 440 parts of a finely divided tetrafluoroethylene/ethylene interpolymer containing 41.4% fluorine or 54.4% tetrafluoroethylene by weight.

Example IV

A tubular high pressure reactor is charged as in Example I with a solution containing 750 parts of oxygen-free water, 3 parts of ammonium persulfate, and 590 parts of tert. butyl alcohol. After closure and evacuation, the reactor is charged with 625 parts of tetrafluoroethylene, 175 parts of ethylene, and 40 parts of carbon monoxide. The reaction is carried out at 60° C. under a pressure of 1000–1400 lbs./sq. in. maintained by injection of oxygen-free water as required. After 3.5 hours the reaction is stopped and the products obtained are worked up as in Example I. There are obtained 350 parts of white powdered three-component tetrafluoroethylene/ethylene/carbon monoxide interpolymer. The interpolymer contains 55.3% fluorine; the presence of carbonyl groups in the interpolymer is definitely established from its infrared spectrum.

Example V

A tubular high pressure reactor is charged as in Example I with a solution containing 1000 parts of water, 780 parts of tert. butyl alcohol and 3 parts of ammonium persulfate. The reactor is closed, evacuated, and charged with a mixture of tetrafluoroethylene and isobutylene containing 51% tetrafluoroethylene by weight. The interpolymerization is run at 65° C., maintaining a pressure of 2100–2200 lbs./sq. in. by injection of additional monomer mixture as required. At the end of 16 hours the reaction is stopped by cooling and the interpolymer slurry is worked up as in Example I to obtain 510 parts of finely divided tetrafluoroethylene/isobutylene interpolymer. The interpolymer contains 46.4% fluorine, corresponding to a mol ratio of tetrafluoroethylene:isobutylene of 1:1.4. Pressed films of the interpolymer have tensile strengths of 6200 lbs./sq. in. at 208% elongation and zero tensile strength temperatures of 205° C.

Example VI

A tubular high pressure reactor is charged as in Example I with 750 parts of oxygen-free water, 3 parts of ammonium persulfate, 590 parts of tert. butyl alcohol and 500 parts of methyl methacrylate. The reactor is closed and evacuated, and there are added 500 parts of tetrafluoroethylene. The interpolymerization is carried out at 65° C., maintaining a pressure of 1500–2200 lbs./sq. in. by injection of oxygen-free water. The reaction is stopped after 4 hours, and the resulting interpolymer is obtained by the method of Example I to yield 360 parts of tetrafluoroethylene/methyl methacrylate interpolymer containing 5% fluorine.

Example VII

A tubular high pressure reactor is charged as in Example I with a solution containing 1000 parts of oxygen-free water, 780 parts of tert. butyl alcohol, and 3 parts of ammonium persulfate. The reactor is closed and evacuated, and there are added 800 parts of tetrafluoroethylene and 200 parts of vinyl fluoride. The reaction is carried out at 55° C., maintaining a pressure of 2300–2500 lbs./sq. in. by the injection of oxygen-free water as required. After 18.5 hours the reaction is stopped and the interpolymer slurry is worked up as in Example I to yield 880 parts of finely divided tetrafluoroethylene/vinyl fluoride interpolymer.

Example VIII

A tubular high pressure reactor is charged as in Example I with 1000 parts of oxygen-free water, 780 parts of tert. butyl alcohol, 4 parts of ammonium persulfate, 2 parts of sodium bisulfite and 750 parts of vinylidene chloride. The reactor is closed and evacuated and 250 parts of vinyl fluoride are added under pressure. The polymerization is carried out at 60° C. under a pressure maintained at 2800–3000 lbs./sq. in. by injection of oxygen-free water as required. After 9.5 hours the reaction is stopped by cooling and the interpolymer is worked up as in Example I. There are obtained 290 parts of powdered vinylidene chloride/vinyl fluoride interpolymer.

Example IX

A pressure reactor is charged with 1000 parts of oxygen-free water, 800 parts of acetone, 3 parts of ammonium persulfate, and 10 parts of disodium phosphate. The charging is carried out under a blank of nitrogen. The reactor is then closed and agitated at 60° C. for 17 hours while pressure is maintained at 1200–1400 lbs./sq. in. by injecting a mixture of tetrafluoroethylene and ethylene having a tetrafluoroethylene:ethylene mol ratio of 1:0.96. A total pressure drop of 1415 lbs./sq. in. is observed. The reaction is stopped by cooling and the thick interpolymer slurry is worked up as in Example I. There are obtained 1380 parts of finely divided tetrafluoroethylene/ethylene interpolymer containing 59.3% fluorine.

This interpolymer softens at 270° C. and has a lower melt viscosity than a similar interpolymer prepared under similar conditions with tert. butyl alcohol instead of acetone.

Repetition of this experiment, using tert. amyl alcohol instead of acetone gives 480 parts of interpolymer of melt viscosity comparable to that obtained in tert. butyl alcohol.

While this invention has been illustrated with particular reference to interpolymers of tetrafluoroethylene and of vinyl fluoride, it is to be understood that the process of said invention is broadly applicable to the preparation of interpolymers of all fluoro compounds having the general formula

wherein X, Y and Z are atoms of the group consisting of hydrogen atoms and halogen atoms having an atomic weight of less than 100 and wherein not more than one of said X, Y and Z atoms is halogen other than fluorine. Included among examples of said compounds are: tetrafluoroethylene, trifluorochloroethylene, trifluorobromoethylene, trifluoroethylene, 1,1-difluoroethylene, 1,2-difluoroethylene, 1 - chloro - 1-fluoroethylene and 1-fluoroethylene.

While this invention is generic to the interpolymerization of compounds having the general formula

as hereinbefore defined, markedly improved interpolymers are had with compounds having the general formula

wherein X, Y and Z are atoms of the group consisting of hydrogen atoms and halogen atoms having an atomic weight of less than 40 and wherein not more than one of said X, Y and Z atoms is halogen other than fluorine.

The process of the instant invention is particularly applicable to the interpolymerization of tetrafluoroethylene, which reacts' the most readily and is, therefore, preferred.

As hereinbefore stated, the instant process comprises interpolymerizing a compound having the general formula

as hereinbefore defined, with another polymerizable compound containing a terminal ethylenic double bond, i. e., with another compound which is polymerizable to a homopolymer having a degree of polymerization greater than that of a trimer and which contains a carbon chain wherein the terminal carbon thereof is attached to the adjacent carbon by means of a double bond. Included among examples of said polymerizable compounds are: monoethylenically unsaturated hydrocarbons, e. g., ethylene, propylene, isobutylene and styrene; halogenated compounds, e. g., tetrafluoroethylene, trifluorochloroethylene, 1,1-difluoro-2,2 - dichloroethylene, 1,2 - difluoro-1,2-dichloroethylene, trifluoroethylene, 1,1-difluoroethylene, 1,2-difluoroethylene, 1-chloro-1-fluoroethylene, 1,1-dichloroethylene, 1,1 - difluoro-2-chloroethylene, bromotrifluoroethylene, chlorotrifluoroethylene, and particularly the vinyl halides, such as vinyl fluoride, vinyl chloride and vinyl bromide; vinyl carboxylates, e. g., vinyl acetate, vinyl benzoate and vinyl esters of higher carboxylic acids; esters, nitriles and amides of alpha-methylene monocarboxylic acids, e. g., methyl methacrylate, methyl alpha-chloroacrylate, methyl alpha-fluoroacrylate, acrylonitrile and methacrylamide; vinyl ethers, e. g., vinyl ethyl ether and vinyl butyl ether; vinyl ketones, e. g., methyl vinyl ketone and phenyl vinyl ketone; N-vinyl compounds, e. g., N-vinyl succinimide, N-vinyl phthalimide and N-vinyl carbazole; compounds containing more than one ethylenic double bond, e. g., 1,3-butadiene, 2-methyl-1,3-butadiene, 2-fluoro-1,3-butadiene, 2-chloro-1,3-butadiene and 2-cyano-1,3-butadiene; and compounds containing acetylenic unsaturation in addition to the ethylenic double bond, e. g., monovinylacetylene, divinylacetylene and vinylethinylcarbinols. Of the subclasses of polymerizable unsaturated compounds disclosed above, those which contain a radical having the general formula

wherein A and B are atoms of the group consisting of hydrogen and fluorine, are preferred because they interpolymerize most readily with tetrafluoroethylene.

Compounds having the general formula

as hereinbefore defined, can be effectively interpolymerized with one or more of said other polymerizable compounds to obtain two-, three-, or multicomponent interpolymers. However, it is to be understood that the mol percentage of compound having the general formula

in the mixture of polymerizable monomers subjected to polymerization (and the mol percentage of said compound in the resultant interpolymer) should be within the range of from 5% to 95%. While appreciable effects are had employing mixtures of the polymerizable monomers in which the mol percentage of the compound having the general formula

is as low as 5%, and also employing mixture of polymerizable monomers in which the mol percentage of said compound is as high as 95%, interpolymers having markedly improved properties are obtained most readily in accordance with this invention when the mol percentage of said compound in said mixture is within the range of from 45% to 90%.

Interpolymerization according to this invention is effected by subjecting the mixture of polymerizable monomers to a polymerization initiator which is a water-soluble salt of a true inorganic peracid, i. e. water-soluble salt of an acid containing the linkage —O—O—, i. e. a water-soluble salt of the group consisting of persulfates, percarbonates, perborates and perphosphates. Included among examples of said water-soluble salts are: potassium percarbonate, sodium perborate, potassium perphosphate and ammonium persulfate. While all water-soluble salts of inorganic peracids are operative in the process of this invention, optimum results are obtained with water-soluble persulfates. Included among examples of said persulfates are: ammonium persulfate; alkali metal persulfates, e. g., potassium and sodium persulfates; alkaline earth metal persulfates, e. g. calcium persulfate. Appreciable polymerization is obtained when the aforementioned polymerization initiator is employed in an amount corresponding to as little as 0.001% of the weight of the mixture of polymerizable monomers. Satisfactory results are also had when the mixture of polymerizable monomers is subjected to 5% or more by weight of said initiator. However, optimum results are obtained when the amount of initiator employed is within the range of from 0.01% to 0.2% of the weight of the polymerizable monomer mixture.

While their use is not essential, it may be desirable in certain instances to add to the reaction mixture activators for the aforementioned initiators, e. g., sodium bisulfite, sodium hydrosulfite and ferrous salts, particularly in the form of ferrous complexes such as the ferrocyanide.

The interpolymerization reaction of this invention is effected in the presence of a medium comprising water and a neutral, water-soluble compound consisting solely of carbon, hydrogen and oxygen, said compound being free from carbon-to-carbon unsaturation, containing from 1 to 5 carbon atoms, and being stable to the oxidizing action of the initiator, i. e., to the action of the water-soluble salt of an inorganic peracid, at the interpolymerization temperature. In other words, said medium comprises water and a neutral, water-soluble organic compound containing from 1 to 5 carbon atoms, of the group consisting of ketones, alcohols, ethers and esters. Said water-soluble organic compounds are free of aldehyde radicals or radicals which form an aldehyde radical upon hydrolysis. Included among examples of said water-soluble organic compounds are: acetone, methyl ethyl ketone, tert. butyl alcohol, tert. amyl alcohol, diethyl ether and dioxane.

Appreciable effects are obtained when said organic compound is soluble in water to the extent of only 10% by weight under the reaction conditions. However, markedly improved results are obtained when the neutral compound, consisting solely of carbon, hydrogen and oxygen, containing from 1 to 5 carbon atoms, free from carbon-to-carbon unsaturation, and stable to the oxidizing action of the catalyst at the interpolymerization temperature which is employed, is completely miscible with water. Optimum results are obtained when said neutral compound is one in which each hydrogen atom thereof attached to carbon is attached to a terminal carbon atom, e. g. tert. butyl alcohol and acetone. These last-named solvents are particularly valuable in that they are not only miscible with water in all proportions and stable to the oxidizing action of the initiator under the interpolymerization conditions, but their use also provides interpolymers having optimum thermal stability, electrical properties and flow properties.

While some improvement in polymerization rate is obtained when the ratio of said neutral organic compound to water in the medium is as low as 10:90, marked improvement in the physical form of the polymer together with markedly greater improvement in polymerization rate results when said ratio is within the range of from 40:60 to 99:1. Maximum improvement is obtained when said ratio is within the range of from 80:20 to 95:5.

Of the various solvent-water combinations disclosed herein, the azotropic mixture of tert. butyl alcohol and water containing 88.2% tert. butyl alcohol by weight is the most valuable. Excellent polymerization rates are obtained in this medium and the interpolymers so prepared are quite satisfactory with respect to molecular weight and physical form. Moreover, it is a simple matter by the steam distillation process set forth below to recover this medium substantially unchanged in composition and free from inorganic impurities for further use.

The presence of molecular oxygen in the interpolymerization system is to be avoided in so far as possible because of its deleterious effects on interpolymer yield and interpolymer quality.

Appreciable interpolymerization of the polymerizable monomers is obtained at temperatures as low as 20° C., while interpolymers of reasonably satisfactory quality are obtained when the interpolymerization is effected at a temperature as high as 150° C. However, in order to provide interpolymers of the highest quality at a rapid rate, the interpolymerization should be effected at a temperature within the range of from 40° C. to 100° C.

Since the compounds having the general formula

as hereinbefore defined, with which this invention is concerned, are gases at ordinary temperatures and atmospheric pressure, the interpolymerization reaction must be conducted under superatmospheric pressure. The particular pressure required for a given interpolymerization depends upon the boiling point of the gaseous monomer or monomers involved and also upon the molecular weight desired in the interpolymer. Low boiling materials require relatively higher pressures than high boiling monomers to achieve the same concentration of reactant; for a given monomer higher pressures result in higher concentrations and provide higher molecular weight interpolymers and higher reaction rates. Pressures as low as three atmospheres have been successfully employed. In general, the upper pressure limit is determined only by the strength of the equipment employed. High pressures of e. g. 1000 atmospheres, can be employed. In most instances interpolymerization in accordance with this invention can be carried out at a satisfactory rate and with the production of interpolymer of satisfactory quality under a pressure within the range of from 10 atmospheres to 300 atmospheres. Optimum results are obtained when the pressure employed is within the range of from 15 atmospheres to 100 atmospheres.

Maintenance of the required reaction pressure can be achieved by injection of additional monomer as the reaction proceeds. The monomers can be injected as a mixture in the proper proportions or individually as desired. Reaction pressure can also be maintained by injection of liquid medium into the reactor as the reaction proceeds. The liquid injected can be either water alone or an aqueous solution of the neutral organic compound as employed in the initial charge. The latter procedure is preferable since it involves no change in composition of medium as the reaction proceeds. However, water injection can be employed satisfactorily provided the initial neutral organic compound: water ratio is high enough, and the water required to maintain pressure is insufficient to bring said ratio below 40:60.

In the absence of buffers, and employing neutral reactants and media, the pH of the reaction mixture normally falls during the interpolymerization to about 2. In most cases this is without consequence; however, in the presence of acid sensitive components in the reaction mixture or for other reasons it may be desirable to buffer the mixture to prevent this pH change through the use of such agents as borax, a sodium metaphosphate, sodium pyrophosphate, sodium acetate, and the like.

If desired, surface active agents can be included in the reaction systems.

If desired, propionic acid, acetamide or acetonitrile may be substituted for the neutral water-soluble compounds (consisting solely of carbon, hydrogen and oxygen which are free from carbon-to-carbon unsaturation, contain from 1 to 5 carbon atoms and are stable to the oxidizing action of the initiator) which are admixed with water to provide the medium for the interpolymerization reaction.

The process of this invention provides a method for preparing interpolymers in a medium comprising water and a neutral water-soluble organic compound as hereinbefore defined, employing inorganic initiators, such as ammonium persulfate. Aside from the advantages obtained through the improved physical form of the interpolymers so prepared, as set forth below, there resides in this process another advantage which is that high yields of interpolymers can be prepared at pressures of as low as 10 atmospheres, whereas considerably higher pressures are required to obtain comparable yields of interpolymer using benzoyl peroxide as the initiator in either water or organic media. Interpolymers of inferior quality and in lower yield are obtained when ammonium persulfate is used as the initiator in water alone. Thus it is seen that the combination of reaction medium and polymerization initiator as provided by this process provides advantages with respect to operating conditions which are of great value for the commercial preparation of such interpolymers.

It has been pointed out that the interpolymers as prepared by the process of this invention are in the form of slurries, the viscosities of which depend upon the ratio of solid interpolymer to liquid medium. This fact is of great importance in large scale operations, and this particular system is admirably adapted to the preparation of interpolymers in semi-continuous or continuous fashion. These interpolymer slurries of moderate solids content pass freely through tubes, valves, and pipes, and exhibit no tendency to form adhesions to the walls of such equipment or to form hard immovable plugs. Another advantage residing in this invention is that the interpolymers prepared are in finely divided form. When separated from the liquid medium and dried as described above, they are obtained as finely divided powders. This, in distinct contrast to the dense physical form of interpolymers prepared in the presence of water alone, is of great advantage in carrying out further manipulations with these interpolymers, such as dissolving them, flame-spraying, and in the preparation of all sorts of molded articles. These finely divided interpolymers are also particularly useful in the preparation of dispersions for use in coating compositions.

The process of steam distillation is of considerable advantage in working up the product obtained according to the process disclosed herein. The polymers of this invention are obtained as slurries or suspensions which vary in consistency from fluids to thick pastes, depending upon the ratio of solid polymer to liquid medium. The particle size of the polymers in these suspensions is quite small and the suspensions have essentially no tendency to settle out on standing. Dilute suspensions may be concentrated somewhat by centrifugalization but a completely satisfactory separation of solid from liquid has not been achieved by this means. Direct separation of polymer from liquid by filtration procedures is quite unsatisfactory since the polymer particles tend to clog the filtering medium and prevent the passage of the liquid.

On the other hand, steam distillation of these suspensions removes essentially all of the tert. butyl alcohol, the polymer being thereby flocculated and obtained as a slurry in water which can be filtered without difficulty. The steam distillation step can be carried out at atmospheric pressure, or, if desired, under diminished pressure to accelerate removal of the alcohol.

Another advantage of steam distillation in this process is that the tert. butyl alcohol can be recovered in the form of its azeotropic mixture with water, containing 88.2% tert. butyl alcohol by weight. Since this composition is the preferred one in which to conduct polymerization according to the method of this invention, steam distillation provides for the direct recovery of medium suitable for further use and free from inorganic materials, such as initiator residues or buffer salts.

The interpolymers prepared according to this invention are tough, high-softening, flexible and thermoplastic. Under elevated temperature and pressure they can be molded into films, foils, tapes, and a wide variety of massive shapes. In addition to their high softening points, they have excellent resistance to chemical reagents, and can be employed for gaskets, bushings, bearings, valves, and the like. Many of these interpolymers, particularly interpolymers of fluorinated ethylenes with ethylenic hydrocarbons, have excellent electrical properties and can be employed in a variety of insulating applications, such as coatings on wire prepared by wrapping of tapes or fibers, or by melt extrusion around a wire, or by coating on a wire from a dispersion or solution. Films of the interpolymers can be employed as dielectrics for condenser construction cases for storage batteries, insulators for transformers, and insulators in cable construction. Containers, chemical reactors, and metallic objects in general can be lined or coated with films of the interpolymers either by solution coating, by coating from dispersion, or by pressing and baking a film on the object to furnish moisture resistant, impervious, corrosion resistant, high softening coatings. Flexible tubing can be fabricated by melt or solution extrusion or by melt sealing a tape into a cylindrical form. The interpolymers can also be spun into useful fibers by melt or solution extrusion or by melt sealing a tape into a cylindrical form. The interpolymers can also be spun into useful fibers by melt or solution extrusion techniques, and these can be oriented by drawing and can be knitted or woven into a variety of useful fabrics. Large monofils can be prepared, for example, by melt extrusion, and are extremely useful as chemically resistant brush bristles.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. The process for obtaining a tetrafluoroethylene/ethylene interpolymer, which comprises subjecting a mixture of tetrafluoroethylene and ethylene to the action of a water-soluble salt of an inorganic peracid, the mol percentage of tetrafluoroethylene in said mixture being within the range of from 45% to 90%, the ratio by weight of said water-soluble salt to said mixture of polymerizable monomers being within the range of from 0.01:100 to 0.2:100, said mixture being subjected to said water-soluble salt in the substantial absence of molecular oxygen at a temperature within the range of from 40° C. to 100° C. under a pressure within the range of from 15 atmospheres to 100 atmospheres in the presence of a medium comprising water and tertiary butyl alcohol, the ratio by weight of water to tertiary butyl alcohol in said medium being within the range of from 5:95 to 20:80.

2. The process for obtaining a tetrafluoroethylene/ethylene interpolymer, which comprises subjecting a mixture of tetrafluoroethylene and ethylene to the action of a water-soluble salt of an inorganic peracid, the mol percentage of tetrafluoroethylene in said mixture being within the range of from 45% to 90/, the ratio by weight of said water-soluble salt to said mixture of polymerizable monomers being within the range of from 0.01:100 to 0.2:100, said mixture being subjected to said water-soluble salt in the substantial absence of molecular oxygen at a temperature within the range of from 40° C. to 100° C. under a pressure within the range of from 15 atmospheres to 100 atmospheres in the presence of a medium comprising water and teritary butyl alcohol, the ratio by weight of water to tertiary butyl alcohol in said medium being within the range of from 5:95 to 20:80, and thereafter subjecting the resultant interpolymer slurry to steam distillation.

3. The process set forth in claim 1 in which said water-soluble salt is ammonium persulfate.

4. The process set forth in claim 2 in which said water-soluble salt is ammonium persulfate.

ROBERT M. JOYCE, Jr.
JOHN C. SAUER.

REFERENCES CITED

The following references are of record in the file of this patent:

UNITED STATES PATENTS

| Number | Name | Date |
|---|---|---|
| 2,278,415 | Arnold | Apr. 7, 1942 |
| 2,328,510 | Thomas | Aug. 31, 1943 |
| 2,342,400 | Hopf | Feb. 22, 1944 |
| 2,362,094 | Renoll | Nov. 7, 1944 |
| 2,362,960 | Thomas | Nov. 14, 1944 |
| 2,388,225 | Brooks | Oct. 30, 1945 |
| 2,393,967 | Brubaker | Feb. 5, 1946 |
| 2,409,948 | Martin | Oct. 22, 1946 |
| 2,419,009 | Coffman | Apr. 15, 1947 |

FOREIGN PATENTS

| Number | Country | Date |
|---|---|---|
| 796,026 | France | Jan. 17, 1936 |